No. 845,217. PATENTED FEB. 26, 1907.
C. BURNETT.
MEANS FOR LOADING AND UNLOADING COAL AND OTHER MINERALS.
APPLICATION FILED MAY 26, 1905.
7 SHEETS—SHEET 1.

Witnesses.
Inventor.
Cuthbert Burnett.

C. BURNETT.

PATENTED FEB. 26, 1907.

MEANS FOR LOADING AND UNLOADING COAL AND OTHER MINERALS.

APPLICATION FILED MAY 26, 1905.

No. 845,217. PATENTED FEB. 26, 1907.
C. BURNETT.
MEANS FOR LOADING AND UNLOADING COAL AND OTHER MINERALS.
APPLICATION FILED MAY 26, 1905.
7 SHEETS—SHEET 7.

FIG. 11.

UNITED STATES PATENT OFFICE.

CUTHBERT BURNETT, OF DURHAM, ENGLAND.

MEANS FOR LOADING AND UNLOADING COAL AND OTHER MINERALS.

No. 845,217.　　　　　Specification of Letters Patent.　　　　Patented Feb. 26, 1907.

Application filed May 26, 1905. Serial No. 262,448.

*To all whom it may concern:*

Be it known that I, CUTHBERT BURNETT, a subject of the King of Great Britain, residing at Belmont House, Durham, in the county of Durham, England, engineer, have invented a new and useful Improvement in Means for Loading and Unloading Coal and other Minerals, of which the following is a specification.

This system of loading and unloading and tipping mined coal and other minerals constitutes a great saving in cost for labor, the apparatus in its leading forms being almost entirely automatic. It comprises means for the emptying and loading of the cage of the tubs carried therein at the bottom of the shaft and for unloading and tipping the coal from the tubs onto or over screens and cleaning-belts close by, or carried in the tubs to a distance or direct into trucks or wagons, or discharging the coal from the tubs onto a conveyer for transport to screens and cleaning-belts situated at a distance. It is applicable for mine-shaft cages with one or more decks, with one or more tubs on each deck.

By my invention the various operations included in the loading and unloading of the mine-cages are simultaneously and almost automatically performed while the transporting of the tubs to and from the usual tipplers on the surface is in the self-contained arrangements entirely dispensed with. This I accomplish by the employment of elevators or their equivalent, my arrangement being specially applicable in the case of mine-cages having two or more decks.

In the accompanying drawings, wherein my invention is illustrated,
Fig. 2ª is a detail view.
Fig. 8 is a plan, and Fig. 9 an end elevation, of another arrangement at the pit top.

Figure 1:
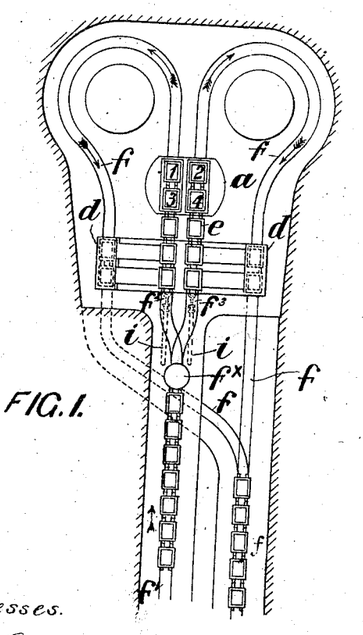
Figure 1 is a plan, Fig. 2 side elevation, Fig. 3 end elevation, of the arrangement at the bottom of the mine-shaft.
Figure 2:
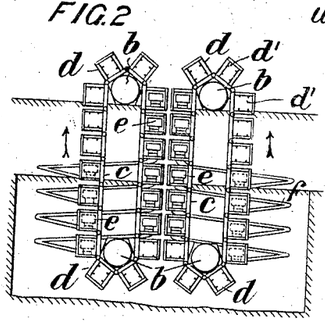
Figure 3:
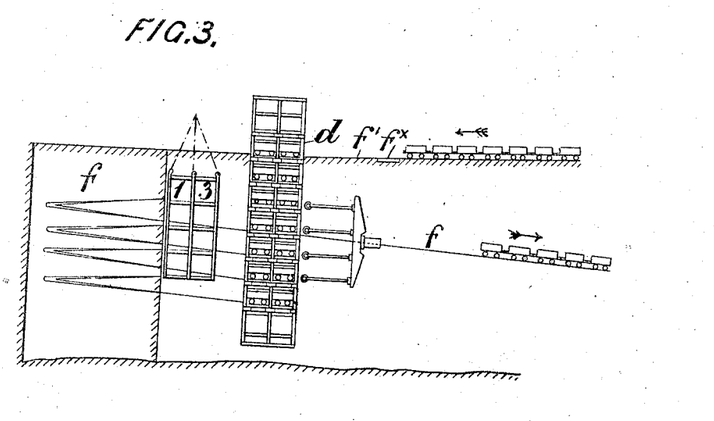

In the form of arrangement illustrated in Figs. 1, 2, and 3 I provide at the bottom of the mine-shaft $a$ two elevators side by side, with the axes of their drums $b$ parallel, on one side of the mine-shaft. Each elevator consists of an endless band $c$, which passes over a top drum $b$ and over a bottom drum $b$, and is provided with equidistant frames or cages each having a top member $d$, provided with rails $d'$, and a bottom member $d$, also provided with rails $d'$, (in Fig. 2 only shown in the empty cages to avoid confusion,) these rails facing each other. Upon the rails which a for the time being are bottom rails rest tubs $e$, those on one side of the elevators, each outer side in this example, being at a time empty and those on the other side, each inner side in this example, full of coal or other mineral. The mine-shaft cage working up and down in the shaft $a$ might be with, say, four decks or tiers, and the number of tubs in a horizontal position on each side of an elevator would correspond thereto. The elevators are by preference and as shown in Fig. 1 fixed at a no less distance than that of one tub between the mine hoist-cages and the elevators. A weigh-bridge for weighing the coals is shown at $f^\times$.

On each deck of the mine-shaft cage and of the elevator-cages there may be one or more tubs or one or more rows of tubs. The outer sides of the elevators are in each tier connected by curved-rail tracks $f$, for instance, as shown in the plan view, Fig. 1, to the far side of the shaft to meet the aforesaid rails on the frames of the mine-shaft cages on that side.

The full tubs are pushed off the elevators onto docks or tiers of the mine-cages by hydraulic rams $i$ (shown in dotted lines, being beneath the loading-roads $f''$ $f^2$ $f^3$ in Fig. 1) or by other suitable mechanical means. One ram may be arranged to operate a frame having the required number of pushers for simultaneously pushing the foremost full tubs onto each deck of the mine-cage, and thereby pushing the empty tubs out of the cage and onto the roads $ff$, or the full tubs may run off by gravity on inclined or tilted rails. The elevators may be propelled by power; but if worked by gravity the loading or full-tub road $f'$ is at a higher level than that of the empty-tub road $f$, so as to give preponderance of weight on the full side of the elevator as against the empty-tub side. By the aforesaid arrangement uninterrupted access is obtained to the elevators for loading them with the full tubs and to the mine-cage for simultaneously loading it in all decks.

Figure 2A:
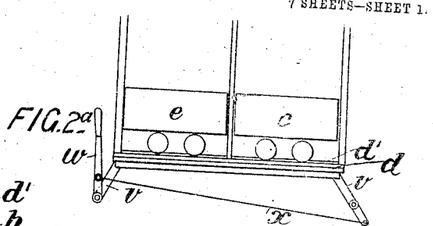

In order to make the empty-tubs run round the mine-shaft by gravity, the aforesaid rail-tracks $f$ are, as shown in Fig. 2, laid with sufficient fall, and I make this to correspond with the height of one of the frames or cages $d\ d'$ of the elevators. The empty tubs so returned to the elevators are by the latter raised again to the necessary height and released and quickly run off the elevator to the empty siding $f$ for being returned to the various parts of the mine in order to be reloaded. The elevators are by preference worked intermittently by any suitable well-known means, the tubs being taken off and put on during the short intervals. Usual stops or keps $v$, Fig. 2$^a$, (employed heretofore in connection with mine-cages,) with working levers $w$ and connecting-rod $x$, are provided in connection with the intermittently-operated elevators, the keps $v$ then supporting the frames $d$ which are being unloaded. The keps are then again withdrawn. These keps $v$ take under the bottoms of the decks of the elevators and are arranged as shown in Fig. 2$^a$. When two full tubs are pushed in, the keps are, by means of the lever W, moved out of the way. When the elevator then moves down, the keps fall automatically under the bottom of the next deck, and so on. As the elevator is moved one deck down on one side it is moved one deck up on the other side, where two empty tubs roll out of the elevator and run along the track $f$ back again into the mines. The full tubs are in the usual manner drawn toward the mine-shaft by means of winding-machines and ropes or chains; but when near the shaft they run down a sloping track of themselves against a stop, which at the right moment is released by the attendant, so that the tub or tubs run into the elevator. This latter is then lowered one deck, and the attendant or his helper then brings along the tubs for the next deck of the elevator, and so on until the elevator has been loaded for the next mine-shaft cage. The full tubs are then on the arrival of the cage rolled into it. The track $f$ for the empty tubs to run back on into the mine is, as shown in Fig. 3, lower down than the track $f'$ for the full tubs. Where the empty tubs leave the elevator, a stop is provided. When this is released, the tubs run out and run down into the mine, where they then are drawn to the charging-place by the winding-machine ropes.

Figure 4:
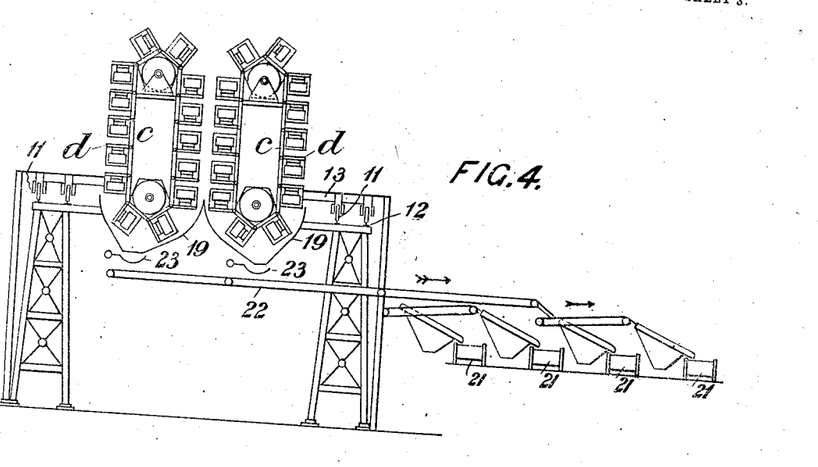
Fig. 4 is a side elevation, Fig. 5 a plan, and Fig. 6 an end elevation, of the arrangement at the pit top.
Figure 5:
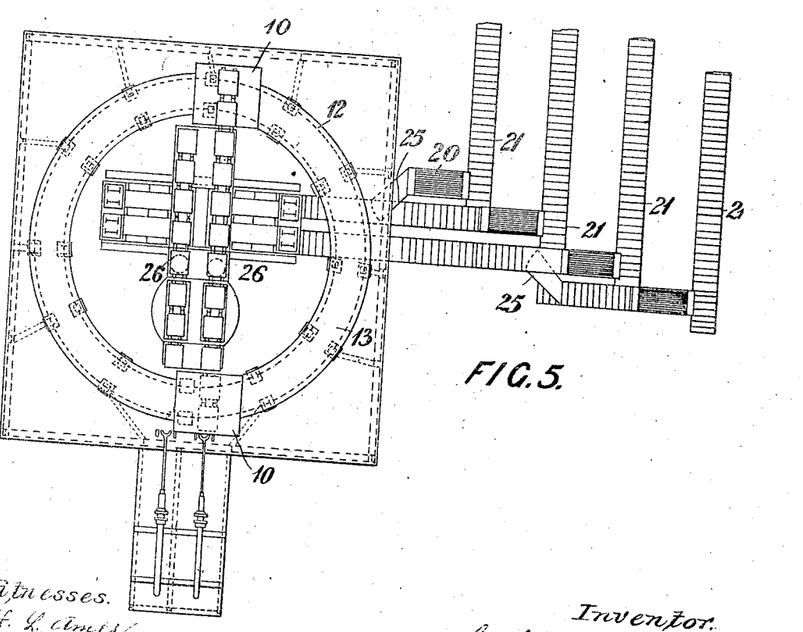
Figure 6:
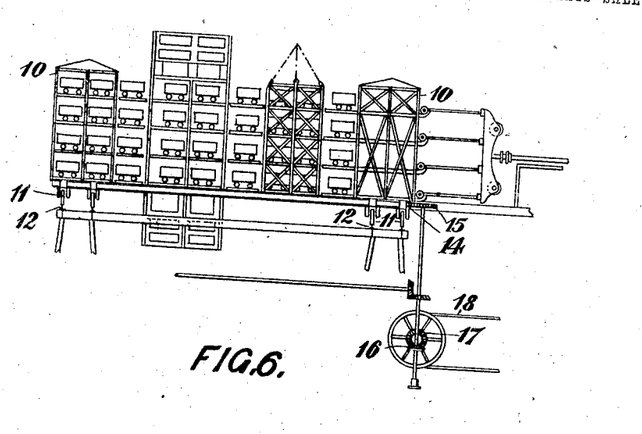

For unloading the mine hoist-cages and tipping the tubs at the pit top I use two elevators, as shown in Figs. 4, 5, and 6, consisting, as described with reference to Figs. 1, 2, and 3, of endless chains $c$, to which are attached a number of decks $d$, agreeing with those of the mine hoist-cage, and I provide in connection therewith what I call two "towers" 10, each consisting of any desired number of tiers or stages to correspond with those of the mine hoist-cages. The towers are mounted on wheels 11 and are opposite to each other, as shown in Fig. 5, and run on a circular track 12, upon which they can be simultaneously carried along, being mounted on a ring or similar circular platform or wheel-base 13. For the purpose of rotating the wheel-base 13 along with the towers thereon I provide it with a circular toothed rack 14, into which gears a suitable pinion 15, the latter to be driven, for instance, as here shown, by bevel-wheels 16, pulley 17, and endless chain 18 from winding-engine.

The towers 10 are adapted to receive tubs on their decks or stages. While the ring-platform 12, Figs. 4, 5, and 6, and the towers 10 are stationary the elevators are also stationary. Hydraulic (or other) pushers may be employed, as shown in Figs. 5 and 6, for pushing the emptied or teemed tubs into the mine hoist-cage and enter them into the elevators. I provide at the bottom of each elevator a chamber 19, having a slanting chute-outlet for emptying the coal onto usual screens 20, and cleaning-belts 21, with (or without) usual conveyers 22, all operated in the ordinary well-known manner, or direct into trucks or wagons. Weighing-machines 23 may be provided below the chutes. Flap-valves or by-passes 25 are or may be applied for directing the coal to one or other screen, according to the quality of the coal. These elevators serve also as tipplers.

The whole apparatus may be driven from the winding-engine, as already explained, or from a separate engine; but in either case the intermittent travel of the towers is by preference in the same direction. When the apparatus is worked from the winding-engine, the time occupied in performing the necessary travel of the elevators will preferably be so regulated as to coincide with the half-revolution of the towers, both being affected a little earlier than the wind, so as to be ready for the change of tubs by the completion of each wind. The towers and elevators may alternatively be worked by electric or other motors.

I prefer, as shown in Figs. 4, 5, and 6, to fix the elevators at a no less distance than that of one tub between the mine hoist-cage and the elevators, at which point I may arrange one or more weigh-bridges, as indicated by the two dotted circles 26, Fig. 5.

For the purpose of holding the tubs in position in the several cages and elevators I employ the usual stops and releasing-gear. The elevators are placed a little way from the mine-shaft, first, because of the coal-dust arising from the emptying, and which dust should not fall down the shaft, but be caught on a bottom plate, and, secondly, in order to provide a weigh-bridge at that place. It is still better to keep the elevator at a distance of two tubs from the mine-shaft and to provide two weigh-bridges there.

Figure 7:
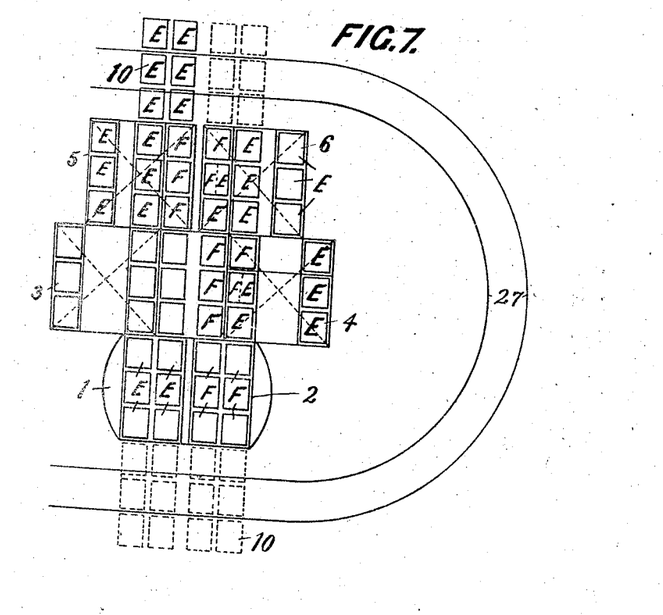
Fig. 7 is a plan of a modified arrangement at the pit top.

In cases where, as shown in the plan view, Fig. 7, the mine-cages are arranged for a double set of tubs a double-rail track would be provided on each platform in the tower and an additional set of elevators. Each of the two mine hoist-cages (marked, respectively, 1 and 2) contains on each deck two rows of tubs, three in each row. The tubs in one cage are marked E, being empty, and the tubs in the other cage are marked F, being full. Two elevators 3 and 4, spaced some distance apart, so as to make room between them for the tubs from the mine-shaft to the elevators 5 and 6, and vice versa, are provided on one side of the mine-shaft and two further elevators 5 and 6 placed close together. The towers 10 10 are mounted on small bogies, which run on the track 27.

For the discharge of the coal and instead of special so-called "tipplers" I use the elevators, as shown in Fig. 4, where the full tubs as they consecutively arrive below are gradually tipped and slowly empty themselves into the funnel 19, having sloping side walls, the coal dropping into the weigh-bridge 23 and from thence onto the conveyer-belt 22 or else direct into a coal-wagon. This new mode of action is of great importance, not only because it does away with the ordinary large and expensive tipper, which requires considerable power to work, but also because the coal falls gradually and quietly from the elevator and is not broken into pieces, thereby producing dust, the result being an article of commerce having a much greater value per ton. The elevators are by preference worked in such manner as not to empty themselves simultaneously, so that only one attendant is required.

For the purpose of stacking the coal or debris, as in case of slackness of trade or other emergency, and for the purpose of dealing with foreign material I provide suitable tramways leading from the mine-shaft at the top to such points or places as it may be desired to deliver the material to and arrange for either the towers or the elevators, or both, to remain stationary when coals are not to be screened and also for changing the men.

The *modus operandi* of the apparatus is as follows: The two towers when in position for the change of tubs to be effected are opposite to each other and in line with each cage alternately on each wind or run of the winding-engine. The tower on the delivery side is charged with empty tubs, which by means of the rams and pushers are forced into the laden cages, thus forcing the full tubs to one of the elevators and the empty tubs from the elevator to the empty tower. On the next wind the towers mutually change positions, that containing the empty tubs being brought to position opposite the other ascending full mine hoist-cage. The other ram and pushers are then brought into action, forcing the full tubs to the second elevator and the empty tubs to the tower, this round of operations continuing to be repeated at each successive wind. Simultaneously with the semirotation of the towers the elevators lower the full tubs and discharge their contents, acting as tipplers, into the chamber 19, with curved chute below, and return the empty tubs at the next wind. This applies to both elevators. The elevators are only provided with the necessary platforms for one cage-load of tubs; but obviously any greater number might be employed.

In Fig. 7 is shown part of an elliptic or flattened circle track, which is applicable where, on account of space, a large circle track is inadmissible; but this arrangement also offers the advantage that it requires a smaller number of tubs in use. This will be understood by reference to Fig. 5, where at its upper part two rows of tubs are shown and at its lower part two rows, each containing two tubs, between the tower 10 and the elevator, between the latter and mine-shaft cage, and between the latter and the tower—that is to say, eight tubs in all; but in Fig. 7 these eight tubs are not found at all, and the towers are brought as near to each other as possible. The towers may suitably be moved by an endless chain which passes around guide-rolls arranged in suitable places.

Figure 11:
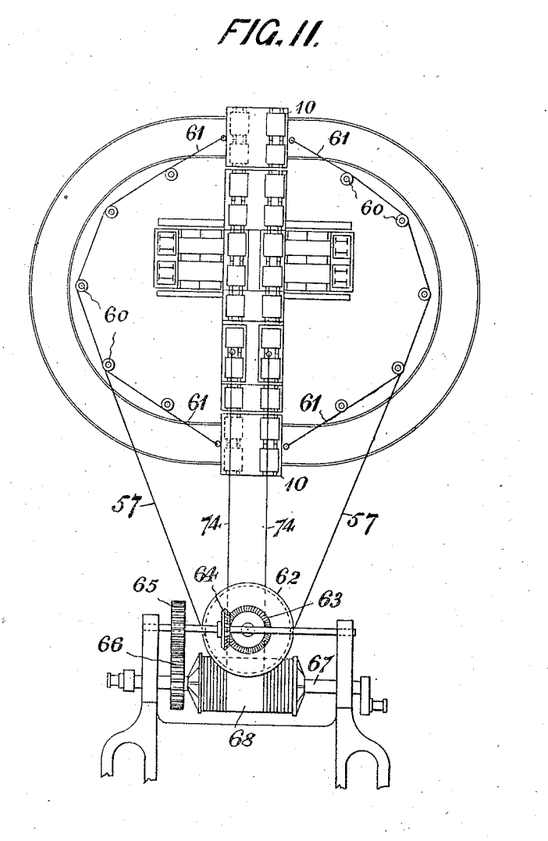
Fig. 11 is a plan showing a means for working the arrangement shown in Fig. 7.

Fig. 11 shows one mode of working the towers on the elliptical track—viz., by an endless chain guided by suitably-distributed rollers 60. The towers, mounted on bogies running on the track, are attached to the chain 57 by drag-links 61. The chain is there shown as passing round a pulley 62, which by bevel-wheels 63 64 and spur-wheels 65 66 is driven from the crank-shaft 67 of a winding-engine with usual winding-drum 68 for working the mine-shaft cage up and down in the mine-shaft.

Figure 8:
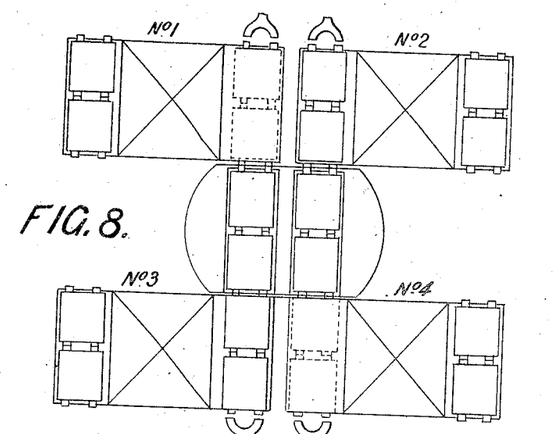
Figure 9:
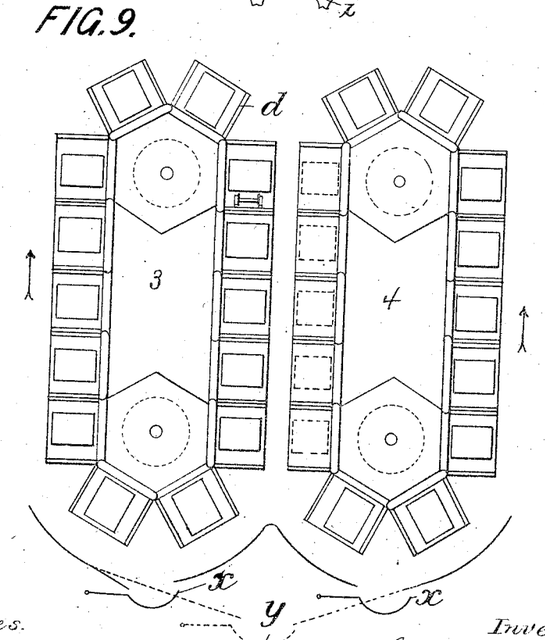

By another arrangement shown in the plan Fig. 8 and elevation Fig. 9 I employ two additional elevators instead of the two towers and preferably work the same from the winding-engine, the travel of the tubs on the tub side downward and upward being at least equal to the added height of the several platforms. The four elevators are arranged in pairs, one pair side by side with their axes parallel on one side of the mine-shaft and the other pair similarly on the other side of the mine-shaft. Looked at in plan I may call the upper left one No 1 and its right-hand neighbor No. 2, and the lower left one No. 3 and the right-hand neighbor No. 4. Hydraulic ram or other pushers, as previously described, are provided against the inner or adjoining sides of elevators Nos. 1 and 2 and against the adjoining sides of the elevators Nos. 3 and 4. Supposing the empty tubs on elevator No. 3 are standing ready to be pushed into the mine hoist-cage and the full tubs delivered from the cage into the elevator No. 1, then this latter will on the next wind of the engine commence to lower the tubs and gradually teem the coal. For weighing the coal in this arrangement I prefer to deliver the coal into the scoop or pan of the weighing-machine. There may be one for each elevator or for each pair of elevators. Elevator No. 3 will remain stationary until the return of the mine-cage with its full load of tubs. The empty tubs will be pushed into the mine-cage and the full tubs delivered into the elevator No. 3. The elevator now commences to discharge or tipple the coals from the tubs in the manner already described with reference to Fig. 4. Elevator No. 1 remains idle until the return of the full cage, whereupon the empty tubs, having come into position, will be delivered into the mine-cage, while the full tubs are delivered to elevator No. 3, and this round of operations will continue to be repeated. What has been described with reference to elevators Nos. 1 and 3 applies also to elevators Nos. 2 and 4.

Figure 10:
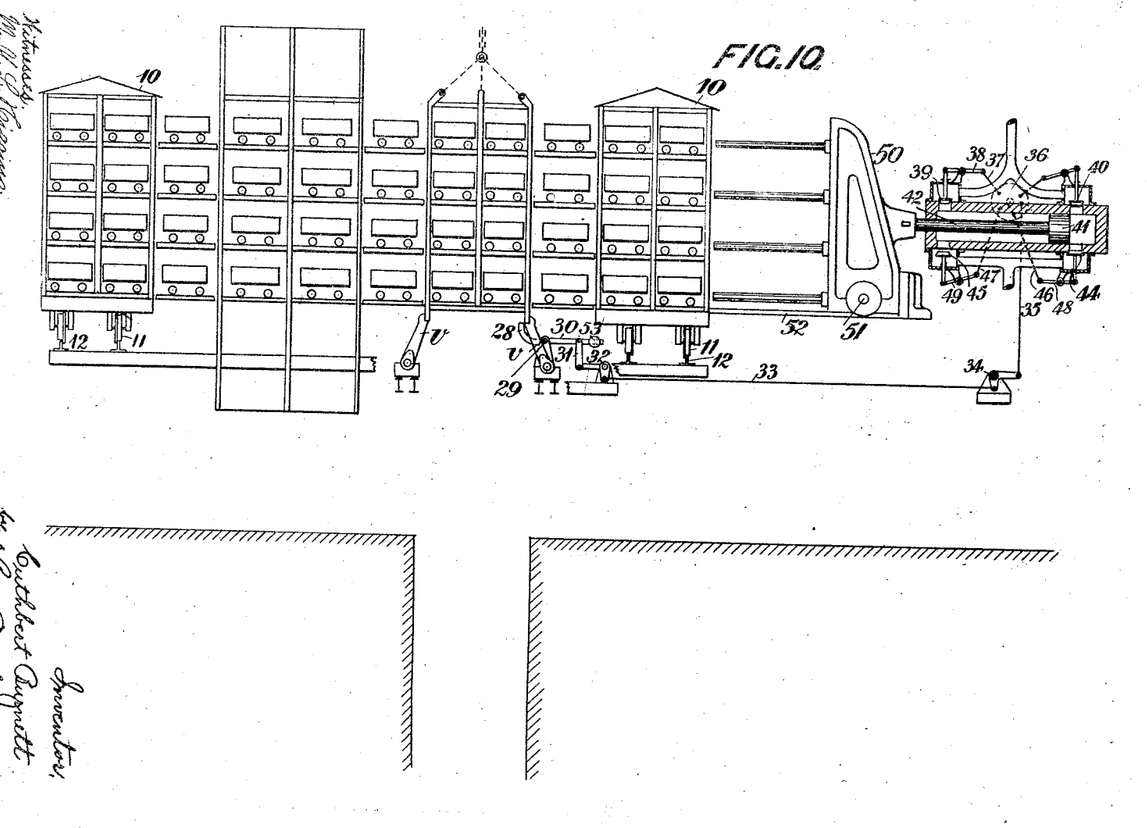
Fig. 10 is an elevation of yet another arrangement at the pit top.

I may arrange for the elevators to work in one direction, as would be the case if the plant were worked by a separate engine, or alternately in opposite directions if worked by the winding-engine. The arrangement may be quite automatic, as shown in Fig. 10, where the mine-shaft cages actuate two hydraulic pushers, which coact with stop devices. The levers 28 are depressed when the cage is let down on the stops or keps $v$. The spindle of the lever 28 carries a lever 30, which by rod 31, lever 32, rod 33, lever 34, and rod 35 is connected with a crank-shaft 36, which by rod 37 and lever 38 serves to move the valves 39 and 40 for inlet of hydraulic pressure to the piston 41 42. The outlet-valves 44 45 are worked from the crank-disk 36 by rods 46 47 and levers 48 49. The piston 41 41 is connected to a frame mounted on wheels 51, which run on a track 52. The piston is at the end 41 of larger diameter for changing the tubs, while the pressure on the annular surface between 41 and 42 moves the piston toward the right. In the position shown the mine-shaft cage has arrived below and rests on the keps $v$, the inlet-valve 40 and the outlet-valve 45 being open. The piston will now push the full tubs into the mine-cage and push the empty tubs from the elevator into the tower. The balance-weight 50 raises the lever 28 again and changes the position of the valves, so that the piston is drawn back in order to be ready for the arrival of the next tower.

Any usual or suitable signaling apparatus is provided at the surface and at the pit-bottom for insuring proper correspondence between the engine-men at the surface and the onsetter at the bottom, and a suitable indicator is provided to show the engine-man that the change has also been effected at the surface in case the aforesaid towers are not visible from the engine-room.

I claim—

1. In combination with a mine-shaft and the mine-shaft cage-hoist worked therein for conveying tubs filled with coal from the mine up to the surface and empty tubs from the surface down to the mine, of elevators each consisting of an endless periodically-moved member, a top drum and a bottom drum, carrying said member, equidistant cages on said member fitted with rails for receiving wheeled tubs, means for periodically moving the elevators, and means for pushing the tubs from the mine-hoist into the elevator-cages or vice versa, substantially as set forth.

2. In combination with a mine-shaft and the cage-hoist worked therein for conveying tubs filled from the mine to the surface, of two elevators arranged at the bottom of the mine-shaft side by side, on one side of the mine cage-hoist, each elevator consisting of an endless periodically-moved member, a top drum and a bottom drum carrying said member, equidistant cages on said member fitted with rails for receiving wheeled tubs thereon, means for periodically moving the elevators, means for pushing the filled tubs into the elevator-cages and thence into the mine cage-hoist, and simultaneously pushing the empty tubs out of the latter, and sloping road-tracks for conveying by gravity the tubs from and to the elevators and from and into the mine, substantially as set forth.

3. In combination with a mine-shaft and the cage-hoist therein for conveying tubs filled from the mine to the surface, each cage having a plurality of decks and rail-tracks on each deck for wheeled tubs, of two elevators arranged at the bottom of the mine-shaft side by side on one side of the mine-shaft, a periodically-moved endless band, equidistant cages on the vertical side parts of the band, a top drum and a bottom drum carrying said band, rail-tracks on each deck corresponding in number and position with the rail-tracks on each mine hoist-cage, means for periodically moving the elevators, means for pushing the filled tubs simultaneously from all the cages on one side of the elevators into corresponding decks of a mine hoist-cage thereby pushing out the empty tubs therein contained, and sloping road-tracks for conveying by gravity the tubs from and to the elevators and from and into the mine, substantially as set forth.

4. In combination with a mine-shaft and the cage-hoist therein, of two elevators arranged at the surface of the mine-shaft side by side on one side of the mine-shaft, each elevator consisting of an endless periodically-moved band, a top drum and a bottom drum carrying said band, equidistant cages on the latter, rails on said cages receiving wheeled tubs thereon, two towers placed opposite each other, wheels supporting the towers, railed tracks on said towers to hold tubs to be moved to exchange places on two opposite sides of the mine-shaft, means for periodically moving the elevators and the towers, means for pushing empty tubs from one of the towers into the mine hoist-cages and thereby pushing the filled tubs from the latter cages into the cages of one of the elevators while also pushing the empty tubs from the latter into one of the towers, means for periodically moving the towers into opposite positions, and chambers with chute-outlets below the elevators into which the contents of the elevator-cages are emptied or tippled, substantially as set forth.

5. In combination with a mine-shaft and the cage-hoist therein, each cage having a plurality of decks and rail-tracks on each deck for wheeled tubs, of periodically-moved endless bands arranged at the surface of the mine-shaft, a top drum and a bottom drum carrying said bands, equidistant cages on the vertical side parts of the endless bands, as there are decks in the mine cage-hoist, rail-tracks on each deck corresponding in number and position with the rail-tracks on each mine-shaft cage, two towers placed opposite each other, wheels supporting the towers, a rail-track on two opposite sides of the mine-shaft, said towers constructed with as many decks with railed tracks as there are decks in each mine hoist-cage, means for periodically moving the elevators, and the towers, means for automatically pushing the empty tubs from one of the towers into the mine hoist-cages and thereby pushing the filled tubs from the latter cages into the cages of one of the elevators while also pushing the empty tubs from the latter into one of the towers, said means being set in operation by the movement of the mine hoist-cage, means for periodically moving the towers into opposite positions, and chambers with chute-outlets below the elevators into which the contents of the elevator-cages are emptied or tippled, substantially as set forth.

6. In combination with a mine-shaft and the cage-hoist therein, of two pairs of elevators arranged at the surface of the mine-shaft, one pair on one side and the other pair on the opposite side of the mine-shaft, each elevator consisting of an endless periodically-moved band or chain, a top drum and a bottom drum for said band, equidistant cages on said band-rails on the cages for receiving wheeled tubs thereon, means for periodically moving the elevators, means for pushing empty tubs from an elevator into the mine hoist-cage and thereby pushing the full tubs from the latter cages into the cages of an opposite elevator while also pushing the empty tubs out from the latter, and chambers with chute-outlets below the elevators into which the contents of the elevator-cages are emptied or tippled, substantially as set forth.

7. In combination with a mine-shaft and the cage-hoist worked therein, of two elevators arranged at the surface of the mine-shaft side by side on one side of the mine cage-hoist, each elevator consisting of an endless periodically-moved band or chain, a top drum and a bottom drum over which said band passes, equidistant cages on said band, rails on the cages for receiving wheeled tubs thereon, two wheeled towers placed opposite each other, railed tracks on the towers to hold tubs and to be moved on a rail-track to exchange places on two opposite sides of the mine-shaft, means for periodically moving the elevators and the towers, automatic means operated by the movement of the mine-cage for pushing empty tubs from one of the towers into the mine hoist-cages and thereby pushing the filled tubs from the latter cages into the cages of one of the elevators, while also pushing the empty tubs from the latter into one of the towers, means for periodically moving the towers into opposite positions and chambers with chute-outlets below the elevators into which the contents of the elevator-cages are emptied or tippled, substantially as set forth.

8. In combination with a mine-shaft and the cage-hoist worked therein, of two elevators arranged at the surface of the mine-shaft side by side, on one side of the mine cage-hoist each elevator consisting of an endless periodically-moved band or chain, a top drum and a bottom drum over which said band passes, equidistant cages on said band, rails on the cages for receiving wheeled tubs thereon, two wheeled towers placed opposite each other, railed tracks on the towers to hold tubs and to be moved on a rail-track to exchange places on two opposite sides of the mine-shaft, means for periodically moving the elevators and the towers, means for automatically pushing the empty tubs from one of the towers into the mine hoist-cages and thereby pushing the filled tubs from the latter cages into the cages of one of the elevators while also pushing the empty tubs from the latter into one of the towers, said means being set in operation by the movement of the mine hoist-cage down upon the keps and comprising lever and rod connections from the keps to inlet and outlet valves of a hydraulic cylinder provided with differential-area piston having its piston-rod connected to a pushing device, substantially as set forth.

In testimony whereof I have signed my name to this specification in the presence of two subscribing witnesses.

CUTHBERT BURNETT.

Witnesses:
H. NIXON,
W. H. NIXON.